US008484218B2

(12) United States Patent
Raghunath

(10) Patent No.: US 8,484,218 B2
(45) Date of Patent: Jul. 9, 2013

(54) TRANSLATING KEYWORDS FROM A SOURCE LANGUAGE TO A TARGET LANGUAGE

(75) Inventor: Mandayam Thondanur Raghunath, Bangalore (IN)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/091,272

(22) Filed: Apr. 21, 2011

(65) Prior Publication Data

US 2012/0271828 A1    Oct. 25, 2012

(51) Int. Cl.
*G06F 17/30*    (2006.01)

(52) U.S. Cl.
USPC .......................... 707/739; 707/760; 707/769

(58) Field of Classification Search
CPC .................................. G06F 17/30; G06F 17/00
See application file for complete search history.

(56) References Cited

U.S. PATENT DOCUMENTS

| 5,263,162 | A | * | 11/1993 | Lundeby ........................ 717/143 |
| 5,384,701 | A | * | 1/1995 | Stentiford et al. ................. 704/3 |
| 5,495,604 | A | * | 2/1996 | Harding et al. ............... 707/690 |
| 5,546,304 | A | * | 8/1996 | Marschner et al. ............... 704/4 |
| 5,546,583 | A | * | 8/1996 | Shriver ........................ 719/313 |
| 5,557,794 | A | * | 9/1996 | Matsunaga et al. .................... 1/1 |
| 5,574,908 | A | * | 11/1996 | Harding et al. ........................ 1/1 |
| 5,590,322 | A | * | 12/1996 | Harding et al. ........................ 1/1 |
| 5,592,668 | A | * | 1/1997 | Harding et al. ........................ 1/1 |
| 5,604,901 | A | * | 2/1997 | Kelley et al. ......................... 1/1 |
| 5,615,301 | A | * | 3/1997 | Rivers ........................... 704/277 |
| 5,659,730 | A | * | 8/1997 | Kelley et al. ......................... 1/1 |
| 5,675,801 | A | * | 10/1997 | Lindsey ........................ 717/108 |
| 5,721,899 | A | * | 2/1998 | Namba .................................. 1/1 |
| 5,748,805 | A | * | 5/1998 | Withgott et al. ............... 382/306 |
| 5,765,131 | A | * | 6/1998 | Stentiford et al. ............ 704/277 |
| 5,774,845 | A | * | 6/1998 | Ando et al. ..................... 704/231 |
| 5,805,775 | A | * | 9/1998 | Eberman et al. ................ 706/11 |
| 5,854,997 | A | * | 12/1998 | Sukeda et al. .................... 704/3 |
| 5,878,425 | A | * | 3/1999 | Redpath ................................ 1/1 |
| 5,956,711 | A | * | 9/1999 | Sullivan et al. ........................ 1/1 |
| 5,978,798 | A | * | 11/1999 | Poznanski et al. ..................... 1/1 |
| 6,041,293 | A | * | 3/2000 | Shibata et al. ..................... 704/4 |
| 6,122,606 | A | * | 9/2000 | Johnson .......................... 704/7 |
| 6,154,720 | A | * | 11/2000 | Onishi et al. ...................... 704/2 |

(Continued)

FOREIGN PATENT DOCUMENTS

WO    WO 2009/015057    1/2009

OTHER PUBLICATIONS

Petras, Vivien, "Translating Dialects in Search: Mapping between Specialized Languages of Discourse and Documentary Languages," Spring 2006, University of Berkeley, pp. 1-275.*

(Continued)

*Primary Examiner* — Farhan Syed

(74) *Attorney, Agent, or Firm* — Fish & Richardson P.C.

(57) ABSTRACT

In one implementation, a method includes receiving a request for translation of one or more first keywords from a source language to a target language; and translating, using a machine translation process, the first keywords from the source language into a plurality of second keywords in the target language. The method can also include determining, by a computer system, frequencies with which each of the second keywords occur in a corpus associated with the target language. The method can further include selecting, by the computer system, a subset of the second keywords to use in the target language based on the determined frequencies of occurrence.

22 Claims, 4 Drawing Sheets

U.S. PATENT DOCUMENTS

| | | | | |
|---|---|---|---|---|
| 6,167,366 | A * | 12/2000 | Johnson | 704/2 |
| 6,233,545 | B1 * | 5/2001 | Datig | 704/2 |
| 6,341,372 | B1 * | 1/2002 | Datig | 717/136 |
| 6,523,170 | B1 * | 2/2003 | Cuomo et al. | 717/136 |
| 6,598,038 | B1 * | 7/2003 | Guay et al. | 1/1 |
| 6,604,101 | B1 * | 8/2003 | Chan et al. | 707/706 |
| 6,715,129 | B1 * | 3/2004 | Hind et al. | 715/239 |
| 6,738,745 | B1 * | 5/2004 | Navratil et al. | 704/277 |
| 7,447,684 | B2 * | 11/2008 | Bates | 1/1 |
| 7,664,629 | B2 * | 2/2010 | Dymetman et al. | 704/4 |
| 7,814,098 | B2 * | 10/2010 | Kamen | 707/726 |
| 7,937,395 | B2 * | 5/2011 | Dexter et al. | 707/748 |
| 8,051,061 | B2 * | 11/2011 | Niu et al. | 707/706 |
| 8,126,880 | B2 * | 2/2012 | Dexter et al. | 707/723 |
| 2002/0038308 | A1 * | 3/2002 | Cappi | 707/104.1 |
| 2002/0198697 | A1 * | 12/2002 | Datig | 704/1 |
| 2004/0181525 | A1 * | 9/2004 | Itzhak et al. | 707/5 |
| 2004/0230418 | A1 * | 11/2004 | Kitamura | 704/8 |
| 2004/0249824 | A1 * | 12/2004 | Brockway et al. | 707/100 |
| 2007/0022134 | A1 | 1/2007 | Zhou et al. | |
| 2007/0033002 | A1 * | 2/2007 | Dymetman et al. | 704/5 |
| 2007/0129935 | A1 * | 6/2007 | Uchimoto et al. | 704/9 |
| 2007/0214158 | A1 * | 9/2007 | Kamen | 707/101 |
| 2008/0065440 | A1 * | 3/2008 | Graham et al. | 705/7 |
| 2008/0313170 | A1 * | 12/2008 | Kamen | 707/5 |
| 2009/0024613 | A1 * | 1/2009 | Niu et al. | 707/5 |
| 2009/0049029 | A1 * | 2/2009 | Choi et al. | 707/5 |
| 2009/0217168 | A1 * | 8/2009 | Dexter et al. | 715/731 |
| 2011/0040767 | A1 * | 2/2011 | Kunjithapatham et al. | 707/749 |
| 2011/0047136 | A1 * | 2/2011 | Dehn | 707/706 |
| 2011/0099186 | A1 * | 4/2011 | Zohar et al. | 707/758 |
| 2012/0109624 | A1 * | 5/2012 | Yang et al. | 704/2 |

OTHER PUBLICATIONS

Zervanou, Kalliopi, "A Corpus Based Approach to Text Summarisation," University of Manchester Institute of Science and Technology, UK, 1998, pp. 1-156.*

Atkins-Krüger, Andy. "Translating Keywords Should Never EVER Happen." Search Engine Watch, Aug. 12, 2009 [Retrieved on Sep. 26, 2010]. Retrieved from the Internet <URL:http://searchenginewatch.com/3634683> (2 pages).

Autorized Officer A. Polzer. International Search Report in International Application No. PCT/US2012/034265, dated Jul. 29, 2012, 11 pages.

* cited by examiner

TRANSLATING KEYWORDS FROM A SOURCE LANGUAGE TO A TARGET LANGUAGE

TECHNICAL FIELD

This document generally describes information presentation.

BACKGROUND

Keywords (e.g., words, phrases, acronyms, abbreviations, tags, or other metadata) have been used in conjunction with a variety of computer systems. For example, keywords have been associated with images and videos to indicate the subject matter of the images and videos. Such keywords have been used by image and video search systems to identify images and videos that are relevant to a search query from a user.

In another example, computer-based advertising systems have been configured to allow advertisers to select keywords that can be used to identify advertising opportunities associated with potentially interested users. Advertising opportunities include opportunities to provide (e.g., display, or audibly output) an advertisement to a user, such as advertisements presented with search results, banner advertisements presented with web pages, and video advertisements played at the start of an electronic video. For instance, an advertiser wanting to present an advertisement for a new fuel efficient car can select a variety of keywords relating to the advertisement, such as "fuel efficient automobile," "fuel efficient car," "fuel efficient vehicle," "mpg" (as in "miles per gallon"), and "high mpg." The advertiser's advertisement can be presented with the search results to user search queries based on, among other things (e.g., outcome of an advertising auction), a comparison of the user search queries (e.g., "high mpg car") and the selected advertising keywords.

Machine translation techniques have been used to translate keywords from a source language to a target language. For instance, an example machine translation technique can use a mapping between words in a source language to words in a target language to translate keywords.

SUMMARY

This document generally describes localized translation of keywords from a source language to a target language. Localized translation of keywords includes translation of keywords that convey a particular meaning in a source language (e.g., English) to keywords that convey a similar, localized meaning in a target language (e.g., French). Such localized translation of keywords can be performed using various corpora associated with the target language, such as a corpus of search query logs in the target language. The corpora in the target language can be analyzed to organically identify common and/or frequently occurring keywords within the target language as actually used by users of the target language.

In one implementation, a method includes receiving a request for translation of one or more first keywords from a source language to a target language; and translating, using a machine translation process, the first keywords from the source language into a plurality of second keywords in the target language. The method can also include determining, by a computer system, frequencies with which each of the second keywords occur in a corpus associated with the target language. The method can further include selecting, by the computer system, a subset of the second keywords to use in the target language based on the determined frequencies of occurrence.

In another implementation, a system for translation of keywords from a source language to a target language includes one or more computers and an interface to the computers that is configured to receive a request for translation one or more first keywords from a source language to a target language. The system can also include a machine translation module of the computers that is configured to translate the first keywords from the source language into a plurality of second keywords in the target language. The system can additionally include a keyword frequency module of the computers that is configured to determine frequencies with which each of the second keywords occur in a corpus associated with the target language. The system can further include a keyword selection component of the computers that is configured to select a subset of the second keywords to use in the target language based on the determined frequencies of occurrence.

In another implementation, a computer program product encoded on a computer-readable medium, operable to cause a data processing apparatus to perform operations including receiving a request for translation one or more first keywords from a source language to a target language; and translating, using a machine translation process, the first keywords from the source language into a plurality of second keywords in the target language. The operations can further include determining frequencies with which each of the second keywords occur in a corpus associated with the target language. The operations can also include selecting a subset of the second keywords to use in the target language based on the determined frequencies of occurrence.

The details of one or more embodiments are set forth in the accompanying drawings and the description below. None, one or more advantages can be provided by the disclosed systems, apparatus, and methods. For example, translated keywords that take into account common usage can more accurately convey the meaning of the keywords from the source language than keywords translated through a traditional machine translation process. In another example, keywords can be accurately translated from a source language to a target language more quickly and at a lower cost than human translation. Additionally, the accuracy in keyword translation can be similar (or perhaps even better) than human translation. In a further example, regional differences in language usage can be readily incorporated into keyword translations—e.g., there may be no need for surveys, polling, or human translators with knowledge of regional differences to incorporate such information into a translation. In another example, changes in keyword usage over time can be organically and automatically integrated into keyword translations without a formal recognition of such a change in a language.

Other features, objects, and advantages of will be apparent from the description and drawings, and from the claims.

DETAILED DESCRIPTION

Figure 1:
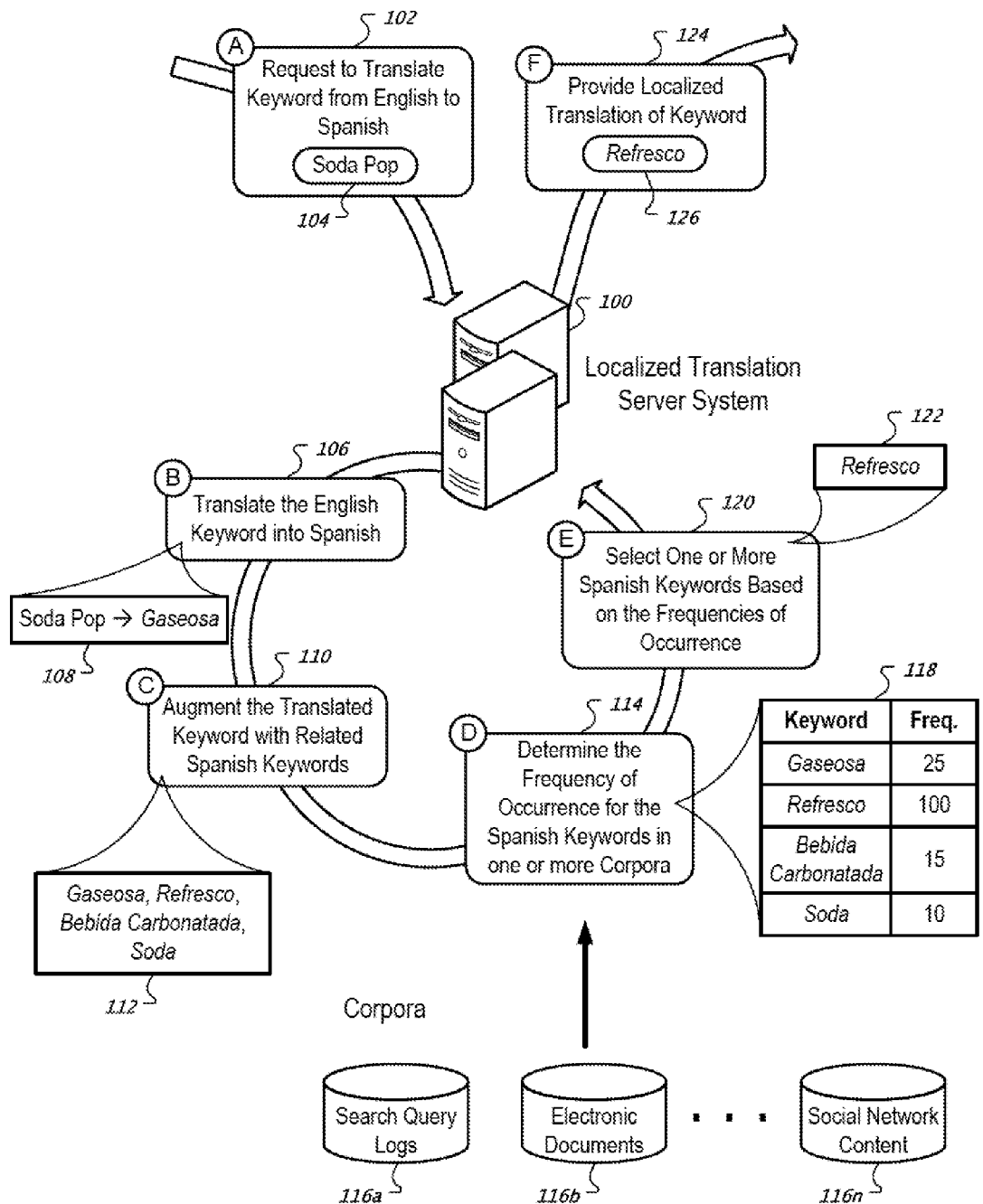
FIG. 1 depicts a conceptual diagram of an example localized translation server system.

This document generally describes localized translation of keywords from a source language to a target language. For example, a party that has generated keywords in English to target English language users may be interested in translating those keywords into other languages, such as French, to target users of other languages. Often times a party will have gone through several revisions before arriving on a set of keywords found to effectively target users in a source language. Localized translation of such source language keywords can allow a party to carry over some of the work product used to develop and refine the source language keywords into keywords for a target language.

Mere translation of keywords using a language-to-language dictionary (e.g., English-to-French dictionary) is unlikely to yield accurate, localized keywords in the target language that have the same meaning as the keywords in the source language. Effective keywords are selected based on localized knowledge of what words and phrases mean in a language—something that is not likely to be accurately reflected in a language-to-language dictionary or to be provided by machine translation techniques. For example, translating the phrase "car insurance" from English into French using an English-to-French dictionary is likely to yield the phrase "l'assurance automobile." However, French speakers more commonly use the phrase "l'assurance voiture" when referring to car insurance. Localized knowledge of what "car insurance" and "l'assurance voiture" mean in English and French, respectively, is useful to effectively translate such keywords.

Human translation has been used to translate such keywords, but it can be costly and time consuming, and it can be difficult to find a translator with localized knowledge of both the source language and the target language.

This document describes localized translation of keywords, such as advertising keywords, without human translation. The described techniques, methods, systems, and computer program products are directed to providing localized keywords using a corpus (e.g., documents, search logs, social network content, etc.) associated with the target language. Localization can be organically achieved by using such a corpus to indicate the best translation of a keyword in target language. Information contained in such a corpus can be anonymized so as to protect user privacy.

A corpus may contain information that may identify users and/or provide details regarding users. For instance, a corpus of search logs may contain a record of search queries and internet protocol (IP) addresses for computers from which the search queries were received. A user may be identified from such IP address information. To protect user privacy, information identifying or otherwise providing details regarding users can be removed and/or masked so that private user information may not be obtained or inferred from a corpus.

In one example, a corpus of search logs (e.g., log of search queries submitted to a search engine by users) in a target language can be used to determine which of multiple candidate keyword translations is likely to be the best translation for an keyword in a source language. Such a determination can be based on a variety of factors, such as a frequency of occurrence for each of the candidate keywords in the search logs. For instance, one or more candidate keywords in the target language that occur in the search logs with the greatest frequency can be selected as the best translation of a keyword in the source language.

Expanding upon the "car insurance" example above, an advertiser wants to translate the keyword "car insurance" from English into French. The keyword can first be translated into a number of candidate keywords in French (e.g., using a machine translation process, or using an electronic language-to-language dictionary). For instance, the candidate keywords can include a variety of keywords, such as "l'assurance automobile" and "l'assurance voiture." Each of the candidate keywords can be examined in light of a corpus (e.g., search log, web pages, or social network content) in French to determine which of the candidate keywords most closely resembles "car insurance" in French, as understood by local French speakers. A variety of metrics can be used to evaluate these candidate keywords in light of the French corpus, such as a frequency with which each of these terms occur in the corpus. For example, if the candidate keyword "l'assurance voiture" occurs more frequently than the candidate keyword "l'assurance automobile," then "l'assurance voiture" can be presumed to be the better localized translation of "car insurance" and can be selected for French language use.

Localized translation can be used for translation of any of a variety of content, such as advertising keywords and/or descriptive keywords that are associated with content (e.g., keywords describing the subject matter of images, videos, articles, etc.). For example, an advertiser can go through several revisions for a set of keywords associated with an advertising campaign (e.g., collection of advertisements for a particular product/service) before arriving at a set of keywords that accurately target users likely to be interested in the advertising campaign. When rolling the advertising campaign out to different regions and/or demographics that use different languages, sets of keywords in these different languages can be readily generated. Localized translation can permit for the meaning of the advertising keywords in the source language, which were revised to more effectively identify users likely to be interested in the advertising campaign, to be carried over to the translated advertising keywords in the target language.

In another example, metadata (e.g., keywords) associated with an image can be translated using localized translation to accurately describe the subject matter of the image in another language. Such translated metadata (e.g., keywords) can be used in a variety of ways. For instance, a search engine providing an image search feature can use translated keywords to serve images to users submitting image search queries in other languages.

These features, as well as other features not previously mentioned, are described below in greater detail with regard to the figures.

FIG. 1 depicts a conceptual diagram of an example localized translation server system 100 that is configured to perform localized translation of content (e.g., keywords) from a source language to a target language. In the depicted example, the localized translation server system 100 receives a request for translation of a keyword from English to Spanish and provides a translated keyword in response.

The localized translation server system 100 can be any of a variety of computing devices, such as a laptop computer, a desktop computer, a distributed server system, or any combination thereof. As indicated by step A (102), the localized translation server system 100 receives an electronic request to translate "soda pop" (keyword 104) from English to Spanish. The electronic request can be received by the localized translation server system 100 through any of a variety of communications channels, such as the Internet, a local area network (LAN), a wide area network (WAN), a virtual private network (VPN), a wireless network (e.g., wifi, cellular telephone network, 3G/4G data network, etc.), or any combination thereof.

Although not depicted, the request can be provided to the localized translation server system 100 by any of a variety of other computing devices, such as another computer server system, a mobile telephone, a smartphone, a tablet computing device, a desktop computer, or any combination thereof. Such another computing device may have previously received an electronic document (e.g., a web page) and/or an application (e.g., standalone keyword translation application, web browser, etc.) through which the request was generated by a user of the other computing device. For example, a user of a other computing device may have previously requested a keyword translation web page that is hosted by the localized translation server system 100 and that contains a form that can be used to request localized keyword translation (e.g., keyword field, source language field, target language field, submit button, etc.). In response to the user of the other computing device entering "soda pop" into the form and performing an action to trigger the request (e.g., select the submit button, complete the fields of the form, etc.), the other computing device can cause the request to be transmitted to the localized translation server system 100.

As indicated by step B (106), the localized translation server system 100 translates the English keyword "soda pop" into Spanish using any of a variety of known translation techniques, such using a machine translation technique that uses an electronic English-to-Spanish dictionary that maps English keywords to Spanish keywords. In the depicted example, the keyword "soda pop" is translated to the Spanish keyword "gaseosa" (108). The translated keyword "gaseosa" can be considered a candidate for the localized translation of "soda pop."

At step C (110), the localized translation server system 100 augments the group of candidate keywords, which includes "gaseosa" after step B, in the target language (Spanish) to include keywords that are related to "gaseosa." Step C can be performed to broaden the group of candidate keywords to include additional, related keywords that have similar but distinct meanings in the target language (Spanish). A variety of techniques can be used to identify related keywords, such as using word clusters that provide groupings of related keywords and/or an electronic thesaurus that provides listings of synonyms. The augmented group of candidate keywords in the target language that, in this example, results from performance of step C includes "gaseosa," "refresco," "bebida cabonata," and "soda" (112).

As indicated by step D (114), the localized translation server system 100 determines the frequency of occurrence for each of the candidate keywords in one or more corpora associated with the Spanish language. The corpora used in step D can include information that, with or without further analysis, indicates how keywords are used in various languages. For instance, example coprora 116a-n that can be used in step D include search query logs 116a, electronic documents 116b, and social network content 116n. The information accessed from the corpora 116a-n can be anonymized, so as to protect user privacy.

The search query logs 116a include records of search queries that have been submitted by users to computer systems, such as search engines. Given that search queries are often times concise, examining search query logs can indicate which keywords users gravitate towards and/or select as the best way to convey a concept or an idea that in which they are interested. For instance, English language users may more frequently submit search queries with the word "car" than with the word "automobile." The greater frequency of "car" in the search query logs 116a can provide an indication of the local preference of English language users with regard to "car" as opposed to "automobile." By using the search query logs 116a, such localized preferences can organically identified and changes in such preferences over time can be automatically identified by continually updating the search query logs 116a with recent user search queries.

A variety of information can be included/associated with the search query logs 116a, such as a language associated with the search query (e.g., language used by a user's computing device), a timestamp for the search query, and/or a geographic region (e.g., continent, country, state, city, etc.) from which the search query was received. Search query logs can be generated by the computer systems that receive search queries. The localized translation server system 100 can be provided with access to the search query logs 116a, which can be organized using various data structures, such as indices and/or hash tables.

When determining the frequency of the candidate Spanish keywords 112 in the search query logs 116a, the search query logs that are examined from the corpus can be narrowed down to search queries that meet various criteria, such as geographic region of origin and/or a timeframe within which the search query was received. For instance, Spanish language keywords used in Mexico may be different than Spanish language keywords used in Spain. When processing the request for translation of "soda pop" to Spanish, the localized translation server system 100 can narrow the Spanish language search query logs used for frequency analysis to those from a geographic region specified (explicitly or implicitly) with the request. Similarly, the localized translation server system 100 can restrict the timeframe for the search query logs that are used. For instance, the localized translation server system 100 can restrict the search query logs to those received within the last hour, day, month, year, 5 years, decade, etc.

The electronic documents corpus 116b can include information regarding electronic documents (e.g., web pages). For instance, the electronic document corpus 116b can include an index of keywords used in various electronic documents and information associated with electronic documents (e.g., language, web address, timestamp, etc.). Like the search query logs 116a, the electronic documents corpus 116b can provide an indication of how keywords are used by users of language and/or within a particular geographic region. For instance, if users creating web pages more frequently use the word "car" than "automobile," such a difference in frequency can provide an indication that users prefer "car" over "automobile." The electronic documents corpus 116b can be created and maintained by an associated computer system (e.g., a search engine, a web crawler engine, etc.) and the localized translation server system 100 can be provided with access to the corpus 116b for at least frequency analysis.

The social network content corpus 116n can include content (e.g., comments, posts, profile information, etc.) generated by users on a social network (e.g., FACEBOOK, TWITTER, LINKEDIN, YOUTUBE, etc.). Similar to the search query logs and electronic documents discussed above, content generated by users of a social network can indicate how keywords are used and what keywords mean within a particular language. The social network content corpus 116n can include a variety of additional information that can be used by the localization translation server system 100 when analyzing the frequency of keywords in the corpus 116n, such as languages associated with social network content, a geographic region from which the content originated, and/or a timestamp for the content. The social network content corpus 116n can be populated and maintained by a corresponding social network server system, and the localized translation server system 100 can be provided access to the corpus 116n.

Various other corpora not depicted or described in FIG. 1 can also be referenced by the localized translation server system 100.

The localized translation server system 100 can determine the frequency of occurrence of the Spanish candidate keywords 112 in one or more of the corpora 116a-n. Table 118 provides example frequencies for the keywords 112 in one or more of the corpora 116a-n. As depicted in the table 118, the keyword "refresco" has the greatest frequency with 100 occurrences and the keyword "gaseosa," which was the original translation of "soda pop" (see step B), has the second greatest frequency with 25 occurrences.

An occurrence can be counted in a variety of ways. For instance, an occurrence can be the number of documents and/or search queries within which a keyword appears, or it can be the number of times the keyword appears (including multiples occurrences within the same document and/or search query). Occurrences can be determined using a variety of data formats, such as a tally (as depicted in table 118), as a percentage, and/or as aggregated levels of occurrence (e.g., high frequency, medium frequency, low frequency).

Occurrences can also be weighted such that some occurrences of keywords have a greater weight (provide a stronger indication) than other occurrences. For example, the occurrence of a keyword in a document title may provide a stronger indication that the keyword is preferred than the occurrence of the keyword in boilerplate language in small font at the bottom of the document. In another example, the first keyword in a search query may have a slightly greater weight than the last keyword in a search query—the user may have ordered the keywords in a search query according to importance. In a further example, refinements to keywords submitted in a series of search queries (e.g., a session) can indicate whether a user found one keyword to more suitable (e.g., yield better results) than another keyword. For instance, if search logs indicate that a user submitted the search query "home building" and then the search query "home construction" (and no further search queries during the user's session), the keyword "home construction" may be inferred as providing results the user preferred over results provided from the keyword "home building." Based on such session information, the keyword "home construction" can receive a greater weight than the keyword "home building." Such indicators of importance and/or user preference can provide indications that can be used to weight occurrences.

As indicated by step E (120), the localized translation server system 100 selects one or more of the Spanish keywords based on the determined frequencies of occurrence, as depicted in the table 118. In this example, the localized translation server system 100 selects "refresco" (keyword 122) based on the keyword 122 having the greatest frequency of occurrence in the one or more of the corpora 116a-n examined by the localized translation server system 100.

As indicated by step F (126), the localized translation server system 100 provides the keyword 122 in response to receiving the request to translate "soda pop" into Spanish. The keyword 122 can be provided to the computing device from which the request for translation was received and can be provided alone or in combination with an electronic document, such as a web page. For instance, the localized translation server system 100 can serve a web page that provides the translation as a result to a request from a user. Such a web page can be provided in any of a variety of electronic data formats, such as HTML, extensible markup language (XML), SHOCKWAVE/FLASH, JAVASCRIPT, and/or HTML5

Figure 2:
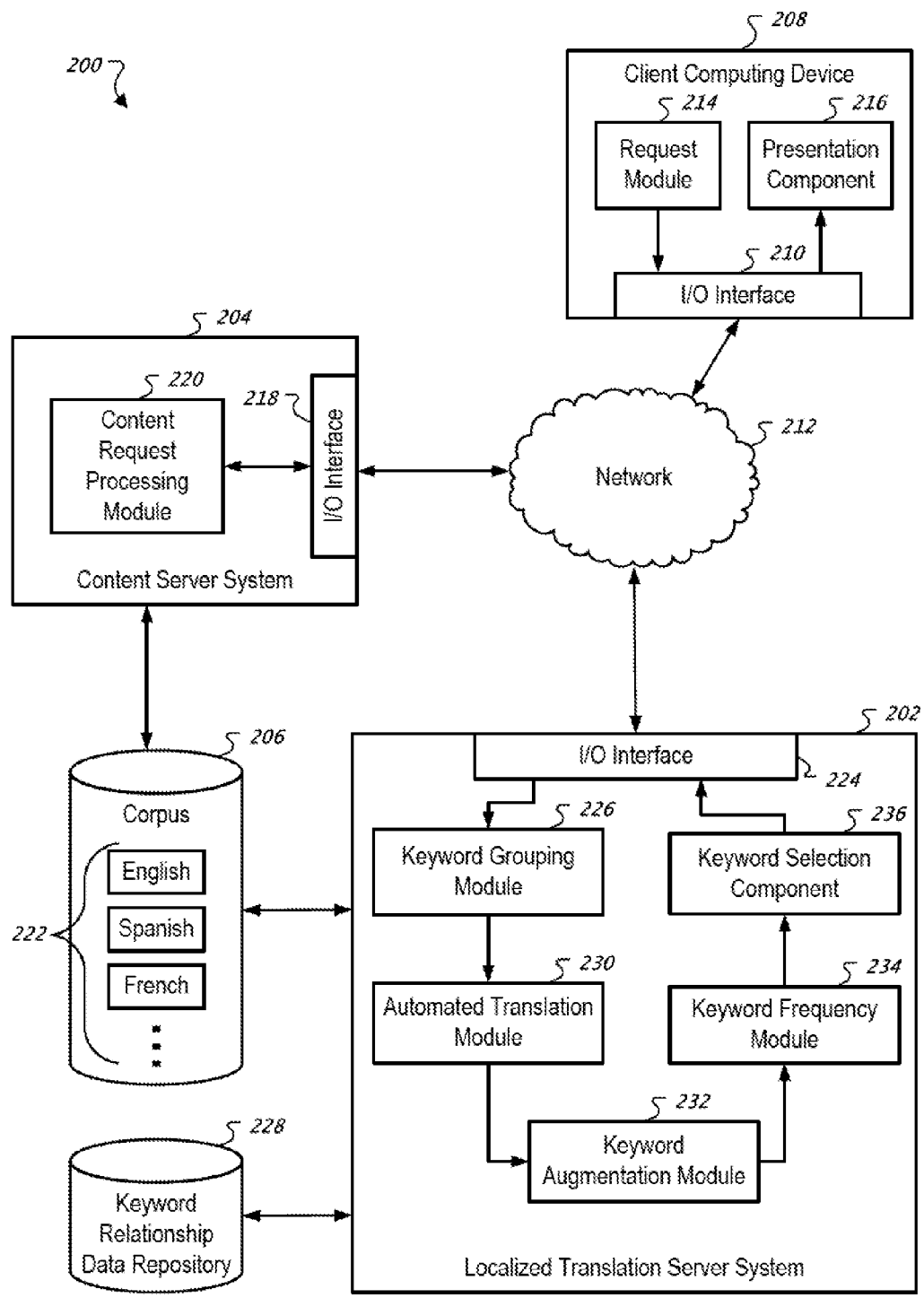
FIG. 2 depicts an example system for providing localized translations of keywords.

FIG. 2 depicts an example system 200 for providing localized translations of keywords. The system 200 includes a localized translation server system 202 that is configured to provide localized translations of keywords. The system 200 also includes a content server system 204 that provides content to users and, as part of the content serving, generates/maintains a corpus 206 that the localized translation server system 202 can use for keyword translation. The example system 200 is also depicted as including a client computing device 208 that can interact with the localized translation server system 202 (e.g., to request keyword translations) and/or with the content server system 204 (e.g., to request content). The localized translation server system 202 can be similar to the localized translation server system 100 described above with regard to FIG. 1.

The client computing device 208 can be any of a variety of computing devices, such as a laptop computer, a desktop computer, a netbook, a mobile telephone, a smartphone, a tablet computing device, and/or a computer server system. The client computing device 208 includes an input/output (I/O) interface 210 that the device 208 uses to communicate with other computing devices over a network 212. The I/O interface 210 can be any of a variety of communications interfaces, such as an Ethernet card, a wireless network card, a cellular network transceiver, or any combination thereof. The client computing device 208 includes a request module 214 that is configured to provide requests for content to the content server system 204 and/or for keyword translations to the localized translation server system 202 over the network 212. The request module 214 can be configured to make such requests in response to user input, such as a user selecting a link and/or button provided by an electronic document (e.g., web page). The client computing device 208 can also include a presentation module 216 that is configured to provide (e.g., display, audibly play, etc.) content and/or translated keywords received from the content server system 204 and/or the localized translation server system 202, respectively, on the client computing device 208.

The network 212 can be any of a variety of networks over which computing devices can communicate. For instance, the network 212 can include a LAN, a WAN, a VPN, a wireless network, the Internet, a point-to-point network, a telephone network (e.g., public switched telephone network (PSTN)), a cellular telephone network, a 3G/4G network, or any combination thereof.

The content server system 204 can be any of a variety of computing devices, such as a desktop computer, a laptop computer, a distributed computer server system, a dedicated computer server system, and/or a colocated computer server system. The content server system 204 is configured to serve requested content to various computing devices, such as the client computing device 208. The content server system 204 can be configured to serve a variety of content, search queries, electronic documents, and/or social network information. For example, the content server system 204 can be a search engine. In another example, the content server system 204 can be a social network system.

The content server system 204 includes an I/O interface 218, which can be similar to the I/O interface of the client computing device 208. The content server system 204 also includes a content request processing module 220 that is configured to serve requests for content, such as search queries and/or requests for pages of a social network. The content request processing module 220 can be configured to store information associated with various received and processed requests. For example, the content request processing module 220 can log search queries received from the client computing device 208 in the corpus 206. In another example, the content request processing module 220 can store content (e.g., comments, posts, etc.) generated by users of a social network (e.g., requests to add new content to the social network) and/or log information regarding requests for content (e.g., a request for a profile page of another user of the social network).

The content request processing module 220 can store information in the corpus 206 in association with one or more languages 222 (e.g., English, Spanish, French, etc.) that are applicable to the information. For example, a search query received by the content server system 204 that is in English from an English language user can be stored in association with English in the corpus 206. In some implementations, separate corpora are used for each of the languages. A variety of additional details can be stored with the information in the corpus, such as a geographic region from which the information originated and/or a timestamp associated with the information.

The localized translation server system 202 can receive a request for localized translation of one or more keywords through the network 212 and an I/O interface 224 of the localized translation server system 202. The I/O interface 224 can be similar to the I/O interfaces 210 and 218. Requests for translation can be received from the client computing device 208. For example, the localized translation server system 202 can be configured to provide a keyword translation service to end-users (e.g., serve web pages, serve keyword data, etc.), such as the client computing device 208. In another example, the localized translation server system 202 can be configured to provide keyword translation information to another computer system that is configured to serve such information to end-users, such as the content server system 204.

The localized translation server system 202 includes a keyword grouping module 226 that is configured to group keywords in a source language into related groups of keywords. These groupings can be used by the localized translation server system 202 to provide context to the meaning of machine translated keywords. Such context can be used to more accurately augment the group of candidate keywords in a target language. For example, when the localized translation server system 202 receives a request to batch translate a plurality of keywords from English (source language) to French (target language), the English keywords can be grouped by the keyword grouping module 226 prior to machine translation and frequency analysis. These groupings can be maintained for the machine translated French keywords to provide context when augmenting the candidate French keywords to include additional related keywords.

For instance, the keyword "jaguar" can refer to a large animal or to a brand of car. If "jaguar" is grouped with keywords related to animals, these other keywords can provide context that indicates an intended meaning for "jaguar." Similarly, if "jaguar" is grouped with keywords related to cars, the context provided by the other keywords can indicate that "jaguar" is intended to correspond to a car brand.

The keyword grouping module 226 can use a keyword relationship data repository 228 (e.g., a database, a file system, etc.) to identify related keywords that should be grouped together. The keyword relationship data repository 228 can map relationships among keywords that can be used by the keyword grouping module 226 to group keywords.

Grouped keywords can be provided by the keyword grouping module 226 to an automated translation module 230 that translates the grouped keywords from a source language to a target language. The automated translation module 230 can use a variety of techniques for translating the keywords, such as referencing an electronic dictionary that maps source language keywords to keywords in the target language and/or using a machine translation process that automatically translates a keyword from a source language to a target language using various rules and/or keyword mappings. The translated keywords in the target language can be referred to as candidate keywords.

The candidate keywords in the target language can be provided to a keyword augmentation module 232 that is configured to augment the group of candidate keywords to include additional, related keywords in the target language. The source language keyword groupings determined by the keyword grouping module 226 can be used by the keyword augmentation module 232 to infer the intended original meaning of the keywords and to identify related keywords. A variety of techniques can be used to identify related keywords in the target language, such as using word clusters and/or an electronic thesaurus.

The augmented group of candidate keywords can then be provided to a keyword frequency module 234 that is configured to determine the frequency of each of the candidate keywords in one or more appropriate corpora, such as a corpus of search query logs in the target language and/or a corpus of electronic documents in the target language. The frequency module 234 can access the corpus 206 generated and maintained by the content server system 204 to make such frequency determinations. Although the localized translation server system 202 is depicted as having access to the corpus 206 without having to use the network 212 and/or the content server system 204, access to the corpus 206 may be provided through the network 212 and/or the content server system 204. The keyword frequency module 234 can use the language associations 222 to identify relevant portions of the corpus for performing the frequency analysis. Additionally, as described above with regard to FIG. 1, keyword occurrences can weighted based on a variety of factors, such as the prominence of a keyword occurrence (e.g., occurs in a document title, occurs in boilerplate, etc.).

The determined keyword frequencies can be provided to a keyword selection component 236 that is configured to select the best translation of the source language keywords based on the determined frequencies. A variety of techniques can be used to make keyword selections based on the determined frequencies of occurrence. For instance, the keyword selection component 236 can select number (e.g., 1, 2, 5, 7, 10, etc.) of candidate keywords that have the greatest determined frequency of occurrence. In another example, the keyword selection component 236 can select candidate keywords that have at least a threshold frequency of occurrence. Keywords can be selected from each of the keyword groupings determined by the keyword grouping module 226. The keyword selection component 236 can provide the selected keywords (in the target language) to a requesting computing device, such as the client computing device 208 and/or the content server system 204, through the I/O interface 224 and the network 212.

Although not depicted, the localized translation server system 202 can cache keyword selections made by the keyword selection component 236 for at least a threshold period of time. If a similar request is received, the cached keyword selections can be used as a shortcut for providing keyword translations to a requesting computing device.

Figure 3:
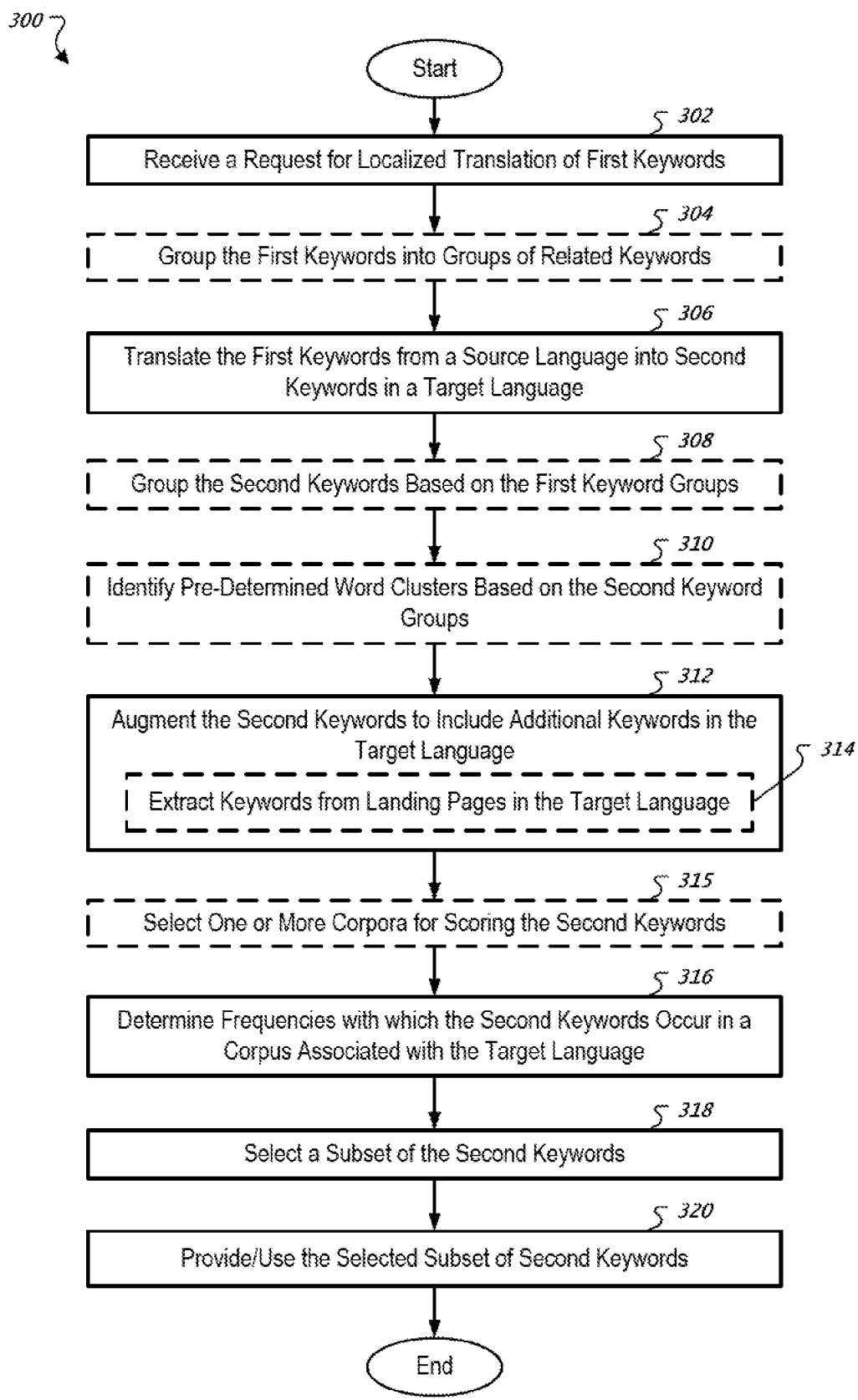
FIG. 3 depicts an example method for providing localized translation of one or more keywords from a source language to a target language.

FIG. 3 depicts an example method 300 for providing localized translation of one or more keywords from a source language to a target language. The method 300 can be performed by any of a variety of computing devices/systems, such as the localized translation server system 100 and/or the localized translation server system 202 described above with regard to FIGS. 1 and 2, respectively.

The method 300 starts at stage 302 when receiving a request for localized translation of one or more first keywords from a source language to a target language. For example, the request can be for translation of a group of English language keywords into Spanish language keywords. Each of the keywords can include one or more words.

In some implementations, the received request can further specify translation of the first keywords into a target language associated with a geographic region. For example, the received request can specify that the English language keywords be translated into Spanish language keywords as used in Mexico (instead of into Spanish language keywords as used in other countries, like Spain). A corpus (or a portion thereof) that is associated with the target language and the requested geographic region can be used to perform the localized keyword translation.

In certain implementations, the first keywords in the source language can be grouped into one or more first groups of related keywords (stage 304). For example, the keyword grouping module 226 of the localized translation server system 202 can group keywords in a source language (the first keywords) prior to performing machine translation. As described above with regard to FIG. 2, the grouping of the first keywords can be used to provide context to the machine translated keywords (in the target language) so as to minimize the meaning of source language keywords being lost in translation.

At stage 306, the first keywords are translated from the source language into a plurality of second keywords in the target language. The translation can be performed using a machine translation process. For instance, the machine translation module 230 described above with regard to FIG. 2 can be used to translate the first keywords from the source language into second keywords in the target language.

In some implementations, the second keywords are grouped into one or more second groups of keywords based on the first groups and the first keywords from which each of the second keywords was translated (stage 308). For example, first keywords $A_s$, $B_s$, $C_s$, and $D_s$ in a source language (e.g., English) are grouped into a first group of related keywords $A_s$ and $B_s$, and into a second group of related keywords $C_s$ and $D_s$. The first keywords are translated at stage 306 into second keywords $A_t$, $B_t$, $C_t$, and $D_t$, respectively, in the target language (e.g., Spanish). The second keywords $A_t$, $B_t$, $C_t$, and $D_t$ can be grouped according to the first keywords from which they were translated (e.g., $A_s$ was translated from $A_t$) and the associated groups for the first keywords (e.g., the first group of $A_s$ and $B_s$). For instance, the second keywords can be grouped as $A_t$ and $B_t$, and as $C_t$ and $D_t$.

In some implementations, one or more pre-determined word clusters for the second keywords can be identified based on the second groups of keywords (stage 310). As described above, a word cluster can include a collection of keywords that have related meanings. The second groups of keywords can be used to identify an appropriate word cluster that conveys a meaning in the target language that is similar to the meaning of the first keywords in the source language. Clusters can be used to provide context to a target language keyword that, alone, has a strong association with a source language keyword but, when viewed in the context of other related target language keyword, has a weaker association with the source language keyword. Expanding upon the example in the previous paragraph, a word cluster in the target language can be identified based on the group of second keywords $A_t$ and $B_t$. Given that the meaning of each of the second keywords $A_t$ and $B_t$ and may have been altered a bit from the meaning of the first keywords $A_s$ and $B_s$ from which they were translated, the grouping of the second keywords $A_t$ and $B_t$ can help to mitigate any drift in the translated keyword meaning and can aid in identifying an appropriate word cluster.

At stage 312, the second keywords (candidate keywords) are augmented to include additional keywords in the target language that each have at least a threshold association with one or more of the second keywords. For example, the keyword augmentation module 234 of the localized translation server system 202 can augment a group of candidate keywords in a target language with related keywords in the target language.

The additional keywords can be identified for inclusion with the second keywords using a variety of techniques. For instance, one or more of the additional keywords can be extracted from one or more landing pages (e.g., web pages) in the target language that are associated with the keywords (step 314). For example, the keywords being translated can be advertising keywords that are associated with advertisements that direct users to one or more landing pages for an advertised product/service. Landing pages for the advertised product/service in the source language and/or the target language can be identified. One or more of the additional keywords that can be included with the second keywords can be extracted from these associated landing pages in the target language. Similarly, one or more of the additional keywords that can be included with the second keywords can be extracted from advertisements in the target language (e.g., extracted from ad creative).

In another example, an additional keyword can be selected for inclusion with the second keywords based on the additional keyword being determined to have at least a threshold association with one of the second keywords. Such a threshold association can be determined based on the additional keyword and the second keyword being identified as synonyms in the target language. Such a threshold association can also be determined based on the additional keyword and the second keyword being included in a predetermined word cluster of semantically similar keywords, such as the word cluster identified at step 310.

In some implementations, one or more corpora are selected to use for scoring the augmented second keywords (stage 315). For example, the localized translation server system 100 can select one or more of the corpora 116*a-n* (e.g., search query logs 116*a*, social network content 116*n*) to use for scoring the Spanish candidate keywords 112, as described above with regard to FIG. 1. The one or more copora can be selected based on a variety of factors, such as a target language for the translation (e.g., Spanish, French) and/or a geographic region associated with the localized translation (e.g., Spain, Mexico). For example, when translating a keyword from English to Spanish for intended use in Mexico (e.g., as specified in a user request), one or more corpora associated with Spanish as used in Mexico can be selected, such as search query logs originating from Mexico and/or social network content from Mexican users.

At stage 316, frequencies with which each of the second keywords occur in a corpus associated with the target language can be determined. For example, the keyword frequency module 234 can determine the frequency with which the second keywords occur in the corpus 206, as described above with regard to FIG. 2. The frequency of occurrence of the second keywords can be performed similar to the step D (114), as described above with regard to FIG. 1.

A variety of corpora can be used to determine the frequency of occurrence for the second keywords. For example, the corpus that is used for frequency of occurrence determinations can include search logs of search queries associated with the target language, similar to the search query log corpus 116a described above with regard to FIG. 1. The determined frequencies can be based on search logs for search queries received within a threshold amount of time of a current time (e.g., with the last hour, day, week, month, year, decade, etc.). In another example, the corpus includes one or more corpora from a search engine, such as a corpus of electronic documents (e.g., the electronic documents corpus 116b). Determining the frequencies of occurrence with such a search engine corpus can include, at least in part, conducting a search for each of the second keywords using an associated search engine computer system. In a further example, the corpus can include user-generated content that is from one or more social networks and that is associated with the target language (e.g., the social network content corpus 116n).

At stage 318, a subset of the second keywords can be selected for use in the target language based at least in part on the determined frequencies of occurrence. For example, the keyword selection component 236 can select keywords to provide for use in the target language based on the frequencies determined by the keyword frequency module 234, as described above with regard to FIG. 2.

At stage 320, the selected subset of the second keywords can be provided to a requesting party and/or used for subsequent processing. For example, the localized translation server system 202 can provide the localized translation of the first keywords to a requesting party, such as the client computing device 208 and/or the content server system 204. In some implementations, the localized translation server system 202 can provide additional keyword based services, such as providing advertisements in response to search queries based on the presence of identified keywords occurring in search queries. For instance, in conjunction with selecting the subset of the second keywords, the subset of the second keywords can be associated with one or more advertisements in the target language. Such keyword-advertisement associations can be used to serve advertisements with relevant content, like search results. For example, advertisements can be provided with search results in a target language that have been identified based on a comparison of the subset of the second keywords associated with the advertisements and a search query.

In some implementations, the selected subset of the second keywords can be provided to a computer system that queues the selected subset of the second keywords for human review. Human review can involve having a person that is proficient in the target language review the selected second keywords to verify that they make sense and/or convey an intended meaning. Such a person may not need to be proficient in or even know the source language, but instead can focus on the whether the selected keywords correspond appropriately to corresponding content (e.g., an advertising landing page, an image, etc.) in the target language. A response can be received from such a computer system indicating whether or not the selected keywords passed the human review. If the keywords pass, then the keywords can be provided and/or used as described above. If the keywords do not pass, then the technique 300 can be performed again with changes to various aspects of the technique, such as changes to the used machine translation process, corpus, keyword grouping, and/or keyword augmentation technique. In some implementations, if the selected subset of second keywords does not pass human review, these keywords can be dropped/excluded and the technique 300 can be rerun with more permissive options (e.g., using lower frequency thresholds).

Figure 4:
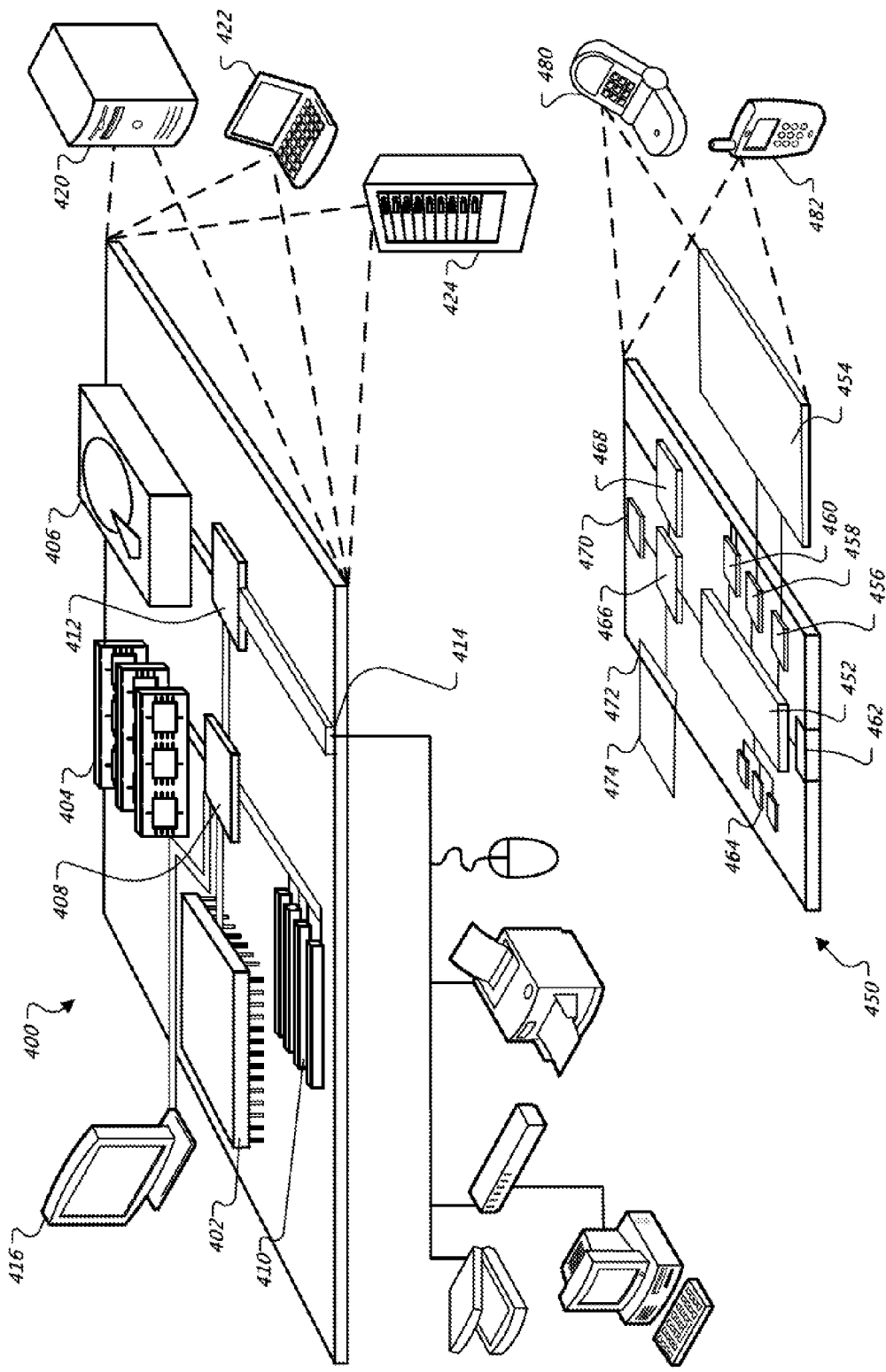
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, apparatus, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing localized translation of keywords may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
grouping a first keyword into one or more first groups of related keywords;
translating, using a machine translation process and after grouping the first keyword into one or more first groups of related keywords, a first keyword from a source language into a plurality of second keywords in a target language;
after translating the first keywords into the second keywords, grouping the second keywords into one or more second groups of keywords based on the first groups and the first keyword from which each of the second keyword was translated;
identifying the one or more pre-determined word clusters for the second keywords based on the second groups of keywords;
augmenting the second keywords to include additional keywords in the target language that each have at least a threshold association with one or more of the second keywords, wherein the additional keywords are determined to have at least the threshold association with the one or more second keywords based on the additional keywords and the one or more second keywords being included in the one or more pre-determined word clusters;
determining, by a computer system after augmenting the second keywords, frequencies with which each of the second keywords occur in a corpus associated with the target language, wherein the corpus comprises one or more corpora used by a search engine, and wherein determining the frequencies includes, at least in part, conducting a search for each of the second keywords using the search engine;
selecting, by the computer system, a particular keyword from the second keywords to use in the target language based on the determined frequencies of occurrence;
associating the particular keyword in the target language with an advertisement in the target language;
receiving a search query comprising one or more search terms in the target language;
determining, by the computer system, whether to provide the advertisement with search results for the search query based, at least, on a comparison of the particular keyword and the one or more search terms of the search query; and
based on the determination of whether to provide the advertisement, providing the advertisement.

2. The computer-implemented method of claim 1, wherein the additional keywords are determined to have at least the threshold association with the one or more second keywords additionally based on the additional keywords and the one or more second keywords being identified as synonyms in the target language.

3. The computer-implemented method of claim 1, further comprising extracting one or more of the additional keywords from one or more landing pages that are in the target language and that are associated with the advertisement.

4. The computer-implemented method of claim 1, wherein the corpus further comprises search logs of search queries associated with the target language.

5. The computer-implemented method of claim 4, wherein the determined frequencies are further based on search logs for search queries received within a threshold amount of time from a current time.

6. The computer-implemented method of claim 1, wherein the corpus further comprises user-generated content associated with the target language and from one or more social networks.

7. The computer-implemented method of claim 1, further comprising:
receiving a request to translate the first keyword into a target language that is associated with a geographic region; and
selecting, from a plurality of corpora, the corpus for use in determining the frequencies of the second keywords based on the corpus being associated with the target language and the geographic region.

8. The computer-implemented method of claim 1, wherein each keyword comprises one or more words.

9. A system for translation of keywords from a source language to a target language, the system comprising:
one or more computers;
a machine translation module of the computers that is configured to translate a first keyword from a source language into a plurality of second keywords in a target language;
a keyword grouping module of the computers that is configured to i) group the first keyword into one or more first groups of related keywords, ii) after translating the first keyword into the second keywords, group the second keywords into one or more second groups of keywords based on the first groups and the first keyword from which each of the second keyword was translated, and iii) identify the one or more pre-determined word clusters for the second keywords based on the second groups of keywords;
a keyword augmentation module that is configured to augment the second keywords to include additional keywords in the target language that each have at least a threshold association with one or more of the second keywords, wherein the additional keywords are determined to have at least the threshold association with the one or more second keywords based on the additional keywords and the one or more second keywords being included in the one or more pre-determined word clusters;
a keyword frequency module of the computers that is configured to determine frequencies with which each of the second keywords occur in a corpus associated with the target language, wherein the corpus comprises one or more corpora used by a search engine, and wherein the frequencies are determined, at least in part, by conducting a search for each of the second keywords using the search engine;
a keyword selection component of the computers that is configured to select a particular keyword from the second keywords to use in the target language based on the determined frequencies of occurrence; and
a content computer system that is configured to:
associate the particular keyword in the target language with an advertisement in the target language;
receive search queries comprising one or more search terms in the target language;
determine whether to provide the advertisement with search results for the search queries based, at least, on a comparison of the particular keyword and the one or more search terms of the search queries; and
based on the determination of whether to provide the advertisement, provide the advertisement.

10. An apparatus comprising a computer-readable storage medium encoding instructions thereon, that in response to execution by a computing device cause the computing device to perform operations comprising:
grouping a first keyword into one or more first groups of related keywords;
translating, using a machine translation process and after grouping the first keyword into one or more first groups of related keywords, a first keyword from a source language into a plurality of second keywords in a target language;
after translating the first keywords into the second keywords, grouping the second keywords into one or more second groups of keywords based on the first groups and the first keyword from which each of the second keyword was translated;
identifying the one or more pre-determined word clusters for the second keywords based on the second groups of keywords;
augmenting the second keywords to include additional keywords in the target language that each have at least a threshold association with one or more of the second keywords, wherein the additional keywords are determined to have at least the threshold association with the one or more second keywords based on the additional keywords and the one or more second keywords being included in the one or more pre-determined word clusters;
after augmenting the second keywords, determining frequencies with which each of the second keywords occur in a corpus associated with the target language, wherein the corpus comprises one or more corpora used by a search engine, and wherein determining the frequencies includes, at least in part, conducting a search for each of the second keywords using the search engine; and
selecting a particular keyword from the second keywords to use in the target language based on the determined frequencies of occurrence;
associating the particular keyword in the target language with an advertisement in the target language;
receiving a search query comprising one or more search terms in the target language;
determining whether to provide the advertisement with search results for the search query based, at least, on a comparison of the particular keyword and the one or more search terms of the search query; and
based on the determination of whether to provide the advertisement, providing the advertisement.

11. The apparatus of claim 10, wherein the operations further comprise extracting one or more of the additional keywords from one or more landing pages that are in the target language and that are associated with the advertisement.

12. The apparatus of claim 10, wherein the operations further comprise:
receiving a request to translate the first keyword into a target language that is associated with a geographic region; and
selecting, from a plurality of corpora, the corpus for use in determining the frequencies of the second keywords based on the corpus being associated with the target language and the geographic region.

13. The system of claim 9, wherein the keyword augmentation module is further configured to extract one or more of the additional keywords from one or more landing pages that are in the target language and that are associated with the advertisement.

14. The system of claim 9, further comprising:
an interface of the computers to receive a request to translate the first keyword into a target language that is associated with a geographic region; and
a repository of corpora that are associated with a plurality of geographic regions and that are in a plurality of languages;
wherein the keyword frequency module is further configured to select, from the repository of corpora, the corpus for use in determining the frequencies of the second keywords based on the corpus being associated with the target language and the geographic region.

15. The system of claim 9, wherein the additional keywords are determined to have at least the threshold association with the one or more second keywords additionally based on the additional keywords and the one or more second keywords being identified as synonyms in the target language.

16. The system of claim 9, wherein the corpus further comprises search logs of search queries associated with the target language.

17. The system of claim 16, wherein the determined frequencies are further based on search logs for search queries received within a threshold amount of time from a current time.

18. The system of claim 9, wherein the corpus further comprises user-generated content associated with the target language and from one or more social networks.

19. The system of claim 9, wherein each keyword comprises one or more words.

20. The apparatus of claim 10, wherein the additional keywords are determined to have at least the threshold association with the one or more second keywords additionally based on the additional keywords and the one or more second keywords being identified as synonyms in the target language.

21. The apparatus of claim 10, wherein the corpus further comprises search logs of search queries associated with the target language.

22. The apparatus of claim 21, wherein the determined frequencies are further based on search logs for search queries received within a threshold amount of time from a current time.

* * * * *